US009402162B1

(12) United States Patent  
Liao

(10) Patent No.: US 9,402,162 B1  
(45) Date of Patent: Jul. 26, 2016

(54) MOBILE DEVICE, POSITIONING METHOD AND NON-TRANSITOR COMPUTER-READABLE RECORDING MEDIUM

(71) Applicant: HTC Corporation, Taoyuan (TW)

(72) Inventor: Chi-Yi Liao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/639,135

(22) Filed: Mar. 5, 2015

(51) Int. Cl.  
*H04W 4/02* (2009.01)  
*H04W 4/04* (2009.01)

(52) U.S. Cl.  
CPC ............. *H04W 4/028* (2013.01); *H04W 4/04* (2013.01)

(58) Field of Classification Search  
CPC ....... H04W 4/04; H04W 12/12; H04W 4/027; H04W 4/028; H04W 4/22; H04W 76/007  
See application file for complete search history.

(56) References Cited

U.S. PATENT DOCUMENTS

| 8,498,811 | B2 | 7/2013 | Lundquist et al. | |
| 9,170,318 | B1* | 10/2015 | Bozarth | H04W 64/00 |
| 2009/0098882 | A1* | 4/2009 | Yoon | H04M 1/72572 |
| | | | | 455/456.1 |
| 2010/0035637 | A1* | 2/2010 | Varanasi | G01C 21/3682 |
| | | | | 455/457 |
| 2011/0045843 | A1* | 2/2011 | Hu | H04L 29/08792 |
| | | | | 455/456.1 |
| 2015/0011247 | A1* | 1/2015 | Ezra | G06F 3/0227 |
| | | | | 455/456.3 |
| 2015/0119074 | A1* | 4/2015 | Holz | G02S 1/66 |
| | | | | 455/456.1 |
| 2015/0133051 | A1* | 5/2015 | Jamal-Syed | H04M 1/7253 |
| | | | | 455/41.2 |
| 2015/0153443 | A1* | 6/2015 | Van Taunay | G01S 5/14 |
| | | | | 702/150 |
| 2015/0296340 | A1* | 10/2015 | Crutchfield | H04W 4/023 |
| | | | | 455/456.1 |
| 2016/0061623 | A1* | 3/2016 | Pahwa | G01C 21/3614 |
| | | | | 701/440 |

FOREIGN PATENT DOCUMENTS

| CN | 203310998 | 11/2013 |
| TW | M348953 | 1/2009 |

OTHER PUBLICATIONS

"Office Action of Taiwan Counterpart Application", issued on Feb. 19, 2015, p. 1-p. 6.

* cited by examiner

*Primary Examiner* — Hirdepal Singh  
(74) *Attorney, Agent, or Firm* — Jianq Chyun IP Office

(57) ABSTRACT

A mobile device, a positioning method and a computer-readable recording medium are provided. The mobile device includes a display, a sensor unit, a transceiver unit, and a processor. The sensor unit provides internal sensor data. The transceiver unit receives at least one external positioning data. The processor calculates a position of the mobile device based on the internal sensor data. The processor obtains a position corresponding to each of the external positioning data based on each of the external positioning data and controls the display to display multiple representative objects. Each of the representative objects is corresponding to one of the positions of the mobile device or the at least one external positioning data.

25 Claims, 4 Drawing Sheets

MOBILE DEVICE, POSITIONING METHOD AND NON-TRANSITOR COMPUTER-READABLE RECORDING MEDIUM

BACKGROUND OF THE INVENTION

1. Field of the Invention

The invention relates to a positioning technique, and more particularly, to a mobile device, a positioning method and a computer-readable recording medium.

2. Description of Related Art

It is quite common that a group of people may be separated from each other easily in a crowd environment, such as a department store, a night market or a concert. Due to the crowd or unfamiliarity of the environment, it is not easy for one who got separated from the group to locate the others. Although almost everybody owns a mobile device (e.g., a cell phone) for communication with each other nowadays, it is still inconvenient to confirm positions of the others by frequently making phone calls or sending messages.

SUMMARY OF THE INVENTION

The invention is directed to a mobile device, a positioning method and a computer-readable recording medium, which are capable solving aforesaid problem regarding the group of people being separated.

The mobile device of the invention includes a display, a sensor unit, a transceiver unit, and a processor. The sensor unit provides internal sensor data. The transceiver unit receives at least one external positioning data. The processor is coupled to the display, the sensor unit and the transceiver unit. The processor calculates a position of the mobile device based on the internal sensor data. The processor obtains a position corresponding to each of the external positioning data based on each of the external positioning data and controls the display to display multiple representative objects. Each of the representative objects is corresponding to one of the positions of the mobile device or the at least one external positioning data.

A positioning method of the invention includes the steps of: providing internal sensor data, calculating a position of a mobile device according to the internal sensor data, receiving at least one external positioning data, obtaining the position corresponding to the external positioning data according to each of the external positioning data, and displaying a plurality of representative objects. Each of the representative objects is corresponding to one of the positions of the mobile device or the at least one external positioning data.

The invention also provides a computer-readable recording medium for storing a computer system. The positioning method may be completed after the computer program is loaded and executed by the mobile device.

Based on the above, the mobile devices in the same group are capable to exchanging the positioning data with each other, so that everyone may be informed of the positions of the others, and may locate each other easily when separated.

To make the above features and advantages of the invention more comprehensible, several embodiments accompanied with drawings are described in detail as follows.

DESCRIPTION OF THE EMBODIMENTS

Figure 1:
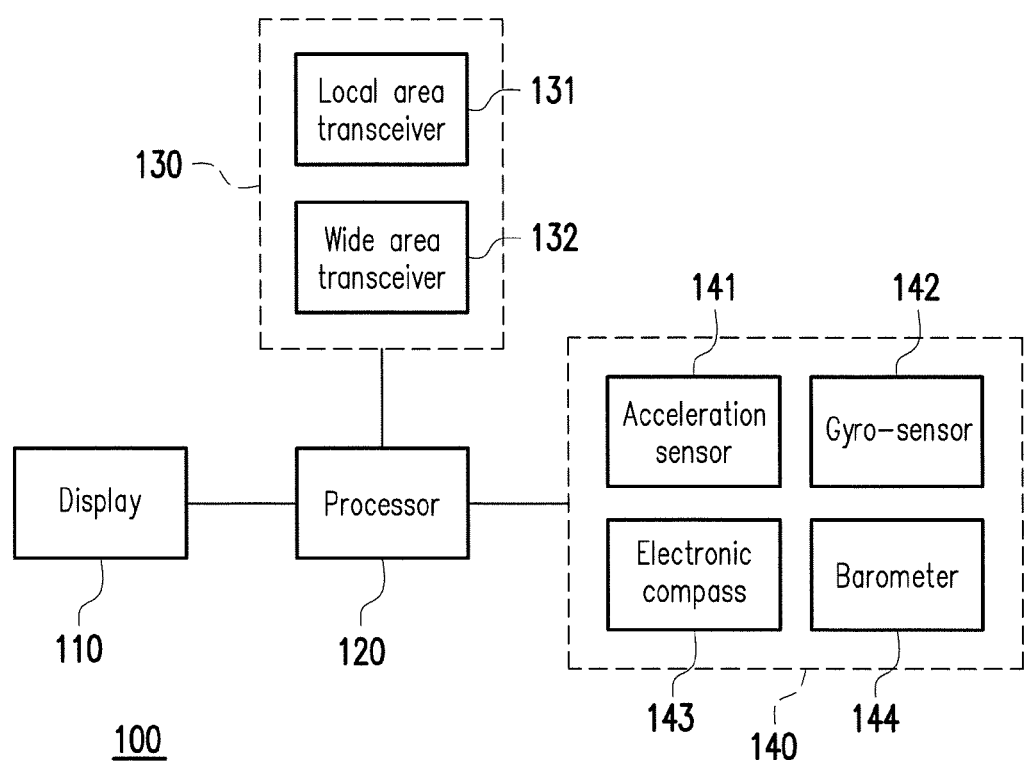
FIG. 1 is a schematic diagram of a mobile device according to an embodiment of the invention.

FIG. 1 is a schematic diagram of a mobile device 100 according to an embodiment of the invention. The mobile device 100 may be a smart hone, a personal digital assistant (PDA) or a tablet computer. The mobile device 100 at least includes a display 110, a processor 120, a transceiver unit 130 and a sensor unit 140. The processor 120 is coupled to the display 110, the transceiver unit 130 and the sensor unit 140. The transceiver unit 130 includes a local area transceiver 131 and a wide area transceiver 132. The local area transceiver 131 may transmit or receive messages for the mobile device 100 by using a local area transmission protocol such as Wi-Fi or Bluetooth. The wide area transceiver 132 may transmit or receive messages for the mobile device 100 by using a wide area transmission protocol such as 3G or 4G. The sensor unit 140 includes an acceleration sensor 141, a gyro-sensor 142, an electronic compass 143 and a barometer 144.

Figure 2:
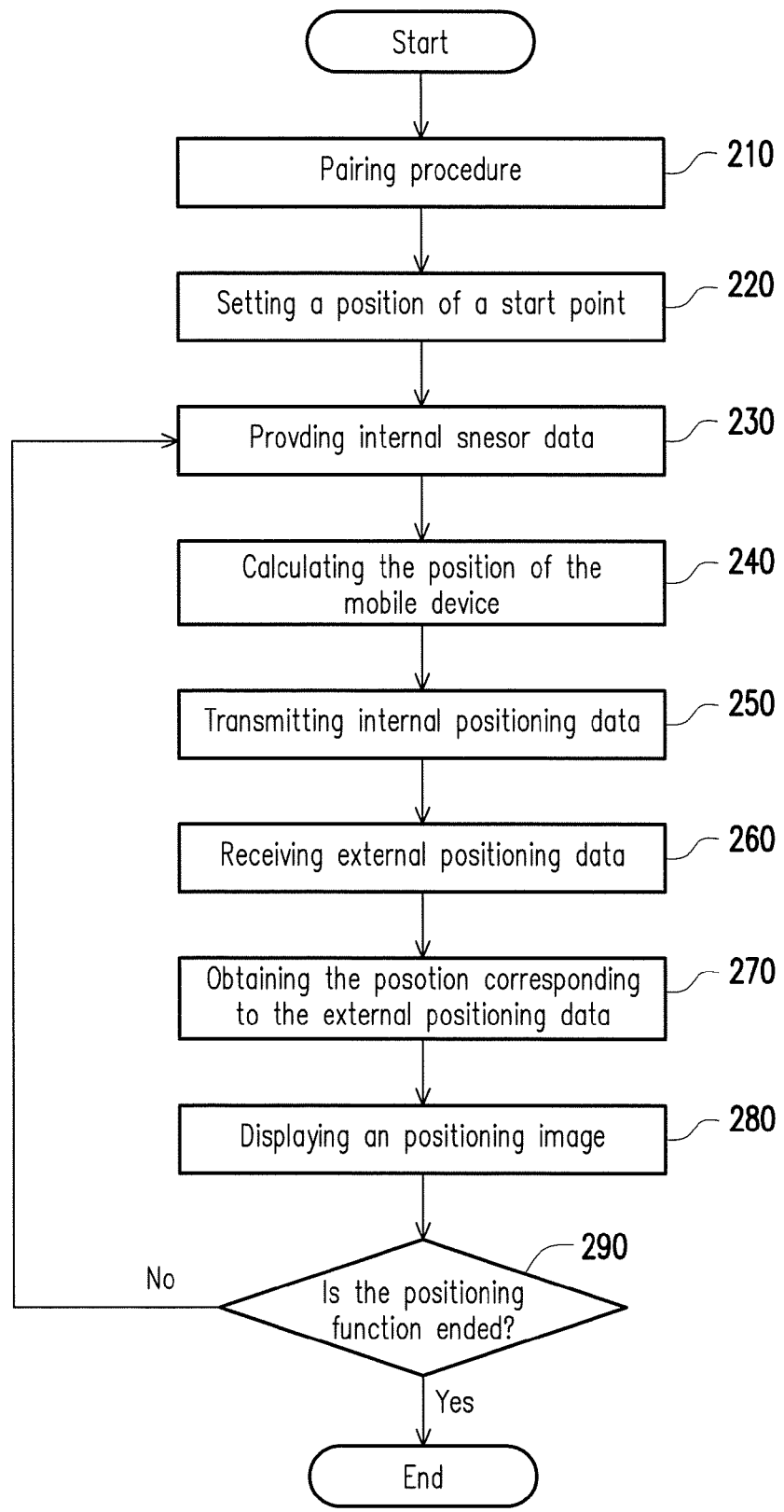
FIG. 2 is a flowchart of a positioning method according to an embodiment of the invention.

FIG. 2 is a flowchart of a positioning method according to an embodiment of the invention. A plurality of the mobile devices in a group of users may exchange their respective positioning data by using the positioning method to learn the relative positions to each other. Each of the mobile devices executes a process of the method depicted in FIG. 2. Basically, the mobile device moves together as the user moves. As such, the user may be positioned if the mobile device can be positioned. Accordingly, even if the group of users got separated from each other in a crowd and unfamiliar environment, each of the users may easily found the others by using the positioning method.

In the present embodiment, the group of users includes at least two users. Each of the users carries one mobile device. The mobile device 100 is one of the mobile devices of the users. The process in the method of FIG. 2 is described below by using the mobile device 100 as an example.

First of all, the group of users is gathered at the same location. In step 210, the processor 120 of the mobile device 100 is connected to the other mobile devices through the local area transceiver 131, and executes a pairing procedure with the other mobile devices in order to obtain a user name of each of the mobile devices. In order to successfully execute the pairing procedure, the users must alls be located within a communication range of the local area transceiver 131. In step 220, the processor 120 sets this gathering location as a start point of the positioning method.

In step 230, the sensor unit 140 provides internal sensor data. The internal sensor data may be composed of sensor data outputted by at least one of the acceleration sensor 141, the gyro-sensor 142, the electronic compass 143 and the barometer 144. The acceleration sensor 141 may be used as a pedometer. The gyro-sensor 142 may detect an angular velocity of a rotation of the mobile device 100. The electronic compass 143 may sense an orientation of the mobile device 100. The barometer 144 may sense a height of the mobile device 100. Accordingly, the processor 120 may calculate motion track of the mobile device 100 started from the start point according to the internal sensor data provided by the sensor unit 140 in step 240, so as to calculate the position of the mobile device 100.

In step 250, the processor 120 controls the wide area transceiver 132 of the transceiver unit 130 to transmit the internal positioning data for the other mobile devices to receive. In an embodiment of the invention, the internal positioning data includes the position of the mobile device 100 obtained from the calculation in step 240. The other mobile devices may directly obtain the position of the mobile device 100 from the internal positioning data. In another embodiment of the invention, the internal positioning data includes the internal sensor data provided by the sensor unit 140. The other mobile devices may calculate the position of the mobile device 100 according to the internal positioning data.

In step 260, the wide area transceiver 132 of the transceiver unit 130 receives the external positioning data provided by each of the other mobile devices. In step 270, the processor 120 obtains the position corresponding to the external positioning data (i.e., the position of the mobile device providing the external positioning data) according to each of the external positioning data. In an embodiment of the invention, each of the other mobile devices places their own calculated positions into the external positioning data for transmission, such that the processor 120 is able to directly obtain the positions of the other mobile devices. In another embodiment, each of the other mobile devices places the external sensor data provided by the sensor unit of the mobile device into the external positioning data for transmission, such that the processor 120 is able to calculate the positions of the mobile devices providing the external sensor data according to the external sensor data.

In step 280, the processor 120 controls the display 110 to display a positioning image having the relative positions according to the position of the mobile device 100 and the position of each of the other mobile devices. In step 290, the processor 120 checks whether the user has ended the positioning function. If the positioning function is not ended, the process returns to step 230.

Figure 3:
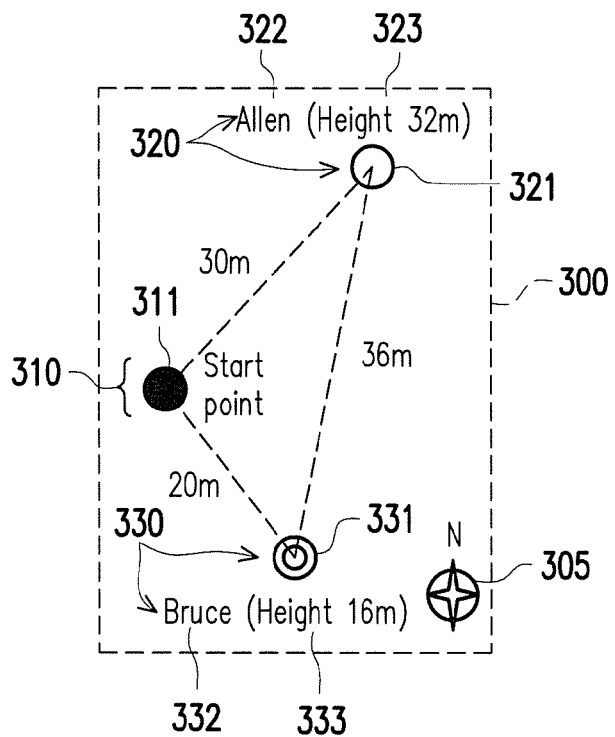
FIG. 3 to FIG. 6 are schematic diagrams illustrating a positioning image according to different embodiments of the invention.

FIG. 3 is a schematic diagram illustrating a positioning image 300 having the relative positions displayed by the display 110 in step 280 according to an embodiment of the invention. The positioning image 300 includes representative objects 310, 320 and 330. The representative object 310 represents the position of the start point. The representative object 310 includes a representative icon 311 for marking the position of the start point. The representative object 330 represents the position of the mobile device 100. The representative object 330 includes a representative icon 331 for marking the position of the mobile device 100. The representative object 330 also includes a user name 332 of the mobile device 100 and a height 333 of the mobile device 100. The height 333 may be a part of the position of the mobile device 100 obtained from the calculation in step 240. The representative object 320 represents the position of another mobile device. The representative object 320 includes a representative icon 321 for marking the position of the another mobile device. The representative object 320 also includes a user name 322 of the another mobile device and a height 323 of the another mobile device. The height 323 may be a part of the position of the another mobile device obtained in step 270. In an embodiment of the invention, the processor 120 may control the display 110 to represent each of the representative objects in different colors in the positioning image, so as to clearly distinguish each of the mobile devices and the user thereof.

The positioning image 300 includes a compass image 305, which is provided for the user of the mobile device 100 to determine relative orientations of the users of the other mobile devices. The processor 120 may calculate a distance between the start point and the mobile device and distances between the other mobile devices according to the relative positions between the mobile device 100 and the other mobile devices, and control the display 110 to display those distances. For example, in the positioning image 300, the distance between the start point and the mobile device 100 is 20 meters, the distance between the start point and the another mobile device is 30 meters, and the distance between the mobile device 100 and the another is 36 meters.

Figure 4:
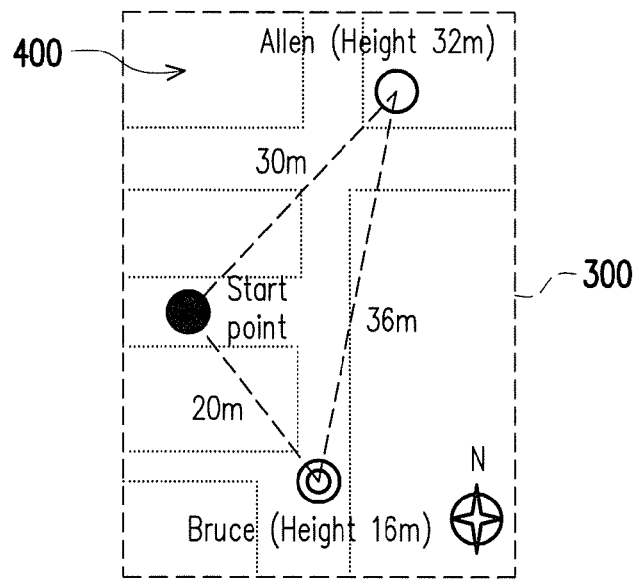

FIG. 4 is a schematic diagram illustrating a positioning image 300 having the relative positions displayed by the display 110 in step 280 according to another embodiment of the invention. In this embodiment, the processor 120 controls the display 110 to display a plane electronic map 400 of a region where the mobile device 100 and the other mobile devices are located. Accordingly, the user of the mobile device 100 is able to clearly learn the positions where he/she and the other users are located.

Figure 5:
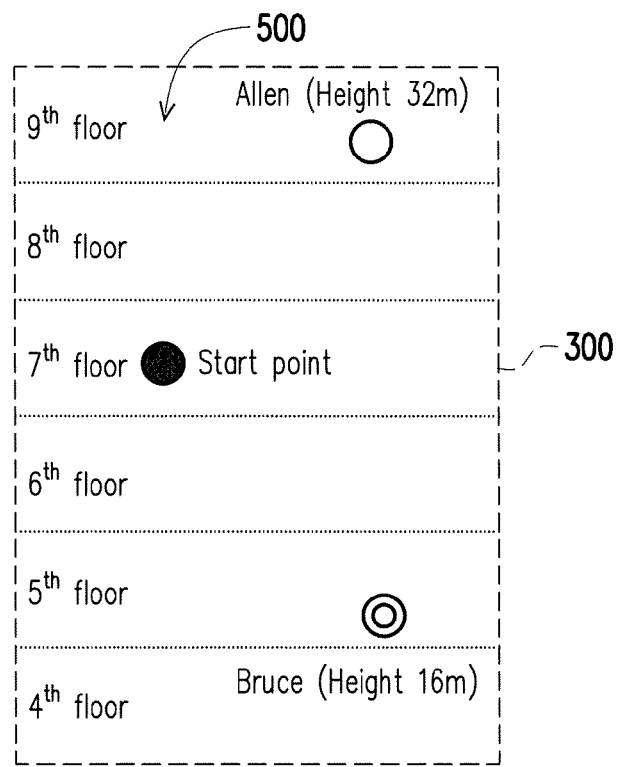

FIG. 5 is a schematic diagram illustrating a positioning image 300 having the relative positions displayed by the display 110 in step 280 according to another embodiment of the invention. In this embodiment, the processor 120 controls the display 110 to display a vertical digital map 500 of a region where the mobile device 100 and the other mobile devices are located. The vertical digital map 500 is a floor map of a building where the mobile device 100 and the other mobile devices are located. Accordingly, the user of the mobile device 100 may be informed of the floors where he/she and the other users are located.

Figure 6:
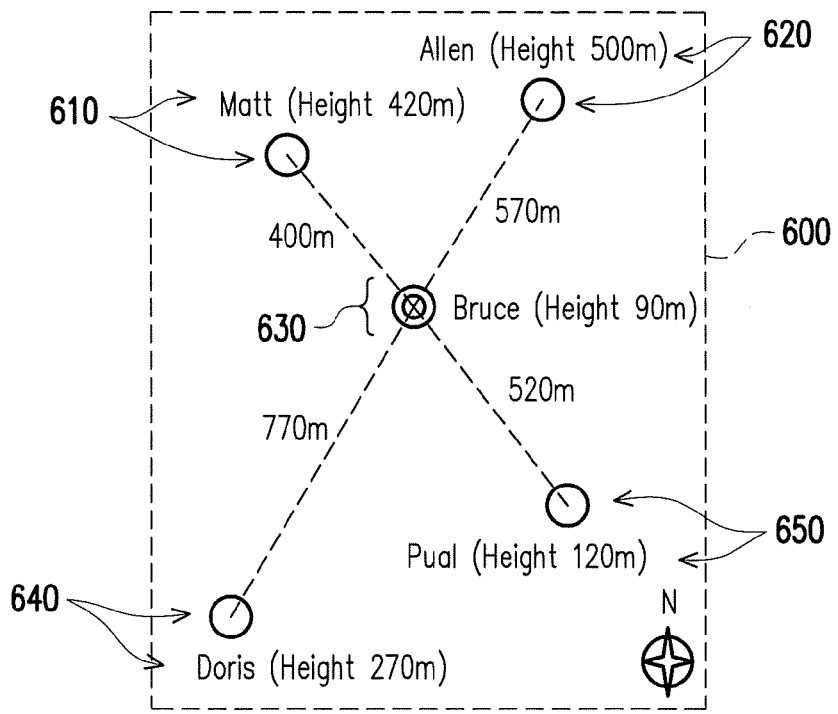

FIG. 6 is a schematic diagram illustrating a positioning image 600 having the relative positions displayed by the display 110 in step 280 according to another embodiment of the invention. The positioning image 600 includes representative objects 610, 620, 630, 640 and 650. The representative object 630 represents the position of the mobile device 100, and the remaining four representative objects indicates the positions of the other four mobile devices. The positioning image 600 does not include the representative object of the start point, and the positioning image 600 takes the mobile device 100 as the center. The processor 120 may calculate a distance between the mobile device 100 and each of the other mobile devices according to the relative positions between the mobile device 100 and the other mobile devices, and control the display 110 to display these distances.

As similar to the embodiments in FIG. 4 or FIG. 5, the positioning image 600 may also include the plane digital map or the vertical digital map of the region where the mobile device 100 and the other mobile devices are located.

A computer-readable recording medium is provided according to an embodiment of the invention. This recording medium may be stored with a computer program. The positioning method may be completed after the computer program is loaded and executed by the mobile device. The recording media may be a physical medium such as a memory, a hard disk or an optical disk.

In summary, the embodiments of the invention are capable of allowing the group of users having multiple mobile devices to be informed of the relative positions to each other at any time without making phone calls or sending messages. As a result, even if the users are in the unfamiliar or complex environment, the other users may still be located quickly to avoid the separation.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A mobile device, comprising:
   a display;
   a sensor unit, providing internal sensor data;
   a transceiver unit, receiving at least one external positioning data and comprising a local area transceiver; and
   a processor, coupled to the display, the sensor unit and the transceiver unit, and configured to set a start point in response to execute a pairing procedure through the local area transceiver, calculate a position of the mobile device according to the internal sensor data, obtain the position corresponding to the external positioning data according to each of the external positioning data, and control the display to display a plurality of representative objects, wherein each of the representative objects is corresponding to one of the positions of the mobile device and the at least one external positioning data,
   wherein the processor calculates motion track of the mobile device started from the start point according to the internal sensor data in order to calculate the position of the mobile device, and the processor controls the display to display another representative object, and the another representative object is corresponding to the position of the start point.

2. The mobile device according to claim 1, wherein each of the external positioning data comprises the position corresponding to the external positioning data, and the processor directly obtains the position from the external positioning data.

3. The mobile device according to claim 1, wherein each of the external positioning data comprises external sensor data, and the processor calculates the position corresponding to the external positioning data according to the external sensor data.

4. The mobile device according to claim 1, wherein the processor calculates at least one distance between the positions according to the positions of the mobile device and the at least one external positioning data, and controls the display to display the at least one distance.

5. The mobile device according to claim 1, wherein each of the representative objects comprises a height corresponding to the position.

6. The mobile device according to claim 1, wherein the processor executes the pairing procedure to obtain a user name corresponding to each of the external positioning data, and each of the representative objects comprises the user name of the mobile device or the user name corresponding to one of the at least one external positioning data.

7. The mobile device according to claim 1, wherein the processor controls the display to represent each of the representative objects in different colors.

8. The mobile device according to claim 1, wherein the processor calculates at least one distance between the start point and the positions according to the positions of the mobile device and the at least one external positioning data, and controls the display to display the at least one distance.

9. The mobile device according to claim 1, wherein the processor further controls the display to display a plane digital map of a region where the positions of the mobile device and the at least one external positioning data are located.

10. The mobile device according to claim 1, wherein the processor further controls the display to display a vertical digital map of a region where the positions of the mobile device and the at least one external positioning data are located.

11. The mobile device according to claim 1, wherein the processor controls the transceiver unit to transmit internal positioning data, and the internal positioning data comprises the position of the mobile device.

12. The mobile device according to claim 1, wherein the processor controls the transceiver unit to transmit internal positioning data, and the internal positioning data comprises the internal sensor data.

13. A positioning method of a mobile device, comprising:
   setting a start point in response to execute a pairing procedure through a local area transceiver;
   providing internal sensor data;
   calculating motion track of the mobile device started from the start point according to the internal sensor data in order to calculate a position of the mobile device;
   calculating the position of the mobile device according to the internal sensor data;
   receiving at least one external positioning data;
   obtaining the position corresponding to the external positioning data according to each of the external positioning data;
   displaying a plurality of representative objects, wherein each of the representative objects is corresponding to one of the positions of the mobile device and the at least one external positioning data; and
   displaying another representative object, wherein the another representative object is corresponding to the position of the start point.

14. The positioning method according to claim 13, wherein each of the external positioning data comprises the position corresponding to the external positioning data.

15. The positioning method according to claim 13, wherein each of the external positioning data comprises external sensor data, and the step of obtaining the position corresponding to the external positioning data comprises:
   calculating the position corresponding to the external positioning data according to the external sensor data.

16. The positioning method according to claim 13, further comprising:
   calculating at least one distance between the positions according to the positions of the mobile device and the at least one external positioning data; and
   displaying the at least one distance.

17. The positioning method according to claim 13, wherein each of the representative objects comprises a height corresponding to the position.

18. The positioning method according to claim 13, further comprising:
   executing the pairing procedure to obtain a user name corresponding to each of the external positioning data, wherein each of the representative objects comprises the user name of the mobile device or the user name corresponding to one of the at least one external positioning data.

19. The positioning method according to claim 13, further comprising:
   representing each of the representative objects in different colors.

20. The positioning method according to claim 13, further comprising:
   calculating at least one distance between the start point and the positions according to the positions of the mobile device and the at least one external positioning data; and
   displaying the at least one distance.

21. The positioning method according to claim 13, further comprising:
displaying a plane digital map of a region where the positions of the mobile device and the at least one external positioning data are located.

22. The positioning method according to claim 13, further comprising:
displaying a vertical digital map of a region where the positions of the mobile device and the at least one external positioning data are located.

23. The positioning method according to claim 13, further comprising:
transmitting internal positioning data, wherein the internal positioning data comprises the position of the mobile device.

24. The positioning method according to claim 13, further comprising:
transmitting internal positioning data, wherein the internal positioning data comprises the internal sensor data.

25. A non-transitory computer-readable recording medium, stored with a computer program, and capable of completing the positioning method of claim 13 after the computer program is loaded and executed by the mobile device.

* * * * *